(12) United States Patent
Shimazu et al.

(10) Patent No.: US 7,618,919 B2
(45) Date of Patent: Nov. 17, 2009

(54) CATALYST SUPPORT AND METHOD OF PRODUCING THE SAME

(75) Inventors: Takashi Shimazu, Nagoya (JP); Ryusuke Tsuji, Aichi-ken (JP); Hideo Sobukawa, Nisshin (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 375 days.

(21) Appl. No.: 11/341,483

(22) Filed: Jan. 30, 2006

(65) Prior Publication Data

US 2006/0172886 A1 Aug. 3, 2006

(30) Foreign Application Priority Data

Jan. 28, 2005 (JP) .............................. 2005-021388

(51) Int. Cl.
*B01J 21/00* (2006.01)
*B01J 21/02* (2006.01)
*B01J 21/06* (2006.01)
*B01J 23/38* (2006.01)

(52) U.S. Cl. ........................ 502/439; 502/325; 502/326; 502/327; 502/328; 502/330; 502/332; 502/340; 502/341; 502/344; 502/349; 502/350; 502/351; 502/355; 502/302

(58) Field of Classification Search .................. 502/302, 502/325, 326, 327, 328, 330, 332, 340, 341, 502/344, 349, 350, 351, 355, 439
See application file for complete search history.

(56) References Cited

U.S. PATENT DOCUMENTS

| 6,627,571 | B1 * | 9/2003 | Lugmair et al. ................. 502/2 |
| 6,933,259 | B2 * | 8/2005 | Hatanaka et al. ............ 502/240 |
| 2002/0090512 | A1 * | 7/2002 | Hatanaka et al. ............ 428/402 |

FOREIGN PATENT DOCUMENTS

| JP | 2002-282689 | * 10/2002 |
| WO | WO 2005/121025 A1 | 12/2005 |

OTHER PUBLICATIONS

Patent Abstracts of Japan, English translation of Abstract for JP 07-300315.
Patent Abstracts of Japan, English translation of Abstract for JP 10-182155.
Patent Abstracts of Japan, English translation of Abstract for JP 2002-79097.
Patent Abstracts of Japan, English translation of Abstract for JP 07-300315, (1995).
Patent Abstracts of Japan, English translation of Abstract for JP 10-182155, (1998).
Patent Abstracts of Japan, English translation of Abstract for JP 2002-79097, (2002).

* cited by examiner

*Primary Examiner*—Timothy C Vanoy
*Assistant Examiner*—Daniel Berns
(74) *Attorney, Agent, or Firm*—Oblon, Spivak, McClelland, Maier & Neustadt, L.L.P.

(57) ABSTRACT

A method of producing a catalyst support comprising a substrate, and coating formed on the surface of the substrate and including powder of a first metal oxide of at least one member selected from the group consisting of alumina, zirconia, titania, iron oxides, oxides of rare earth elements, alkali metal oxides and alkali earth metal oxides, wherein the coating is obtained by heat treating the substrate after applied with a coating composition obtained by mixing the first metal oxide powder together with a fluid raw material composition containing raw material of a second metal oxide of at least one member selected from the group consisting of alumina, zirconia, titania, iron oxides, oxides of rare earth elements, alkali metal oxides and alkali earth metal oxides, at a shear rate of 1000 sec$^{-1}$ or higher.

16 Claims, 6 Drawing Sheets

CATALYST SUPPORT AND METHOD OF PRODUCING THE SAME

BACKGROUND OF THE INVENTION

1. Field of the Invention

The present invention relates to catalyst supports having coating containing metal oxide powder and also relates to a method to produce the same.

2. Related Background Art

Various catalysts have been developed such as catalysts for hydrogen production reaction to generate hydrogen as a fuel in fuel reforming systems such as fuel cells, and catalysts for the purification of exhaust gas to purify toxic components emitted from internal combustion engines like automobiles. Various kinds of substrates including honeycomb filters, on which a metal oxide such as alumina, and a noble metal such as platinum, rhodium and palladium are supported, have been generally used as such catalysts.

In general, powder obtained by wet grinding method has been heretofore used as such metal oxides. For example, Japanese Patent Application Laid-Open Gazettes No. Hei. 10-182155 (Document 1) and No. 2002-79097 (Document 2) disclose methods to obtain compound metal oxide powder by preparing oxide precursors from salt solutions of aluminum, cerium, and zirconium by coprecipitation method and then calcining the yielded oxide precursors in the air. In addition, in Japanese Patent Application Laid-Open Gazette No. Hei. 7-300315 (Document 3), a method is disclosed to obtain compound metal oxide powder by first adding boehmite alumina powder to a mixed solution of salt solutions of cerium and zirconium, and the mixture was then stirred followed by the drying and calcination of the resultant.

However, when conventional metal oxide powder like that described in Documents 1 to 3 is used, adhesion to substrates (especially to metal substrates) is not always sufficient and there is also a limitation for formation of thin film coating formed on the substrate. Therefore, it has been a problem because of difficulties in supporting such conventional metal oxide powder when using substrates such as metallic honeycomb filters and high density (high integration) honeycombs (e.g. microchannels equal to or greater than 1200 cell/inch$^2$) with narrower tubular passages than those of common honeycomb filters, as well as limitation in the improvements of reforming performances.

SUMMARY OF THE INVENTION

The present invention was made in the light of problems associated with the above described conventional technologies. The object of the present invention is to provide catalyst supports having coating with high adhesion to various substrates like honeycomb filters in spite of containing metal oxide powder in the coating, and capable of sufficiently improving reforming performances in hydrogen production reaction and so on and also to provide methods possible to produce such catalyst supports.

In order to accomplish the above-described objects, the present inventors have made the following discoveries as a result of eager studies leading to the completion of the present invention. Metal oxide coating obtained by using colloidal solutions of metal oxides or metal salt solutions as they are is non-uniform with insufficient adhesion property. However, when colloidal solutions of metal oxides or metal salt solutions are mixed at a high shear rate and used preferably after rapid drying, obtained metal oxides are surprisingly novel having nanopores with diameters of 10 nm or less with highly improved adhesion to various substrates. By making substrates support metal oxide powder by the use of such a metal oxide as matrix, high adhesion to various substrates is achieved. Furthermore, when catalysts are obtained by using such substrates with metal oxide powder and metal oxide matrix, reforming performances in hydrogen production reaction and so on can be markedly improved.

A catalyst support of the present invention comprises:
a substrate; and
coating formed on the surface of the substrate and including powder of a first metal oxide of at least one member selected from the group consisting of alumina, zirconia, titania, iron oxides, oxides of rare earth elements, alkali metal oxides and alkali earth metal oxides, and a matrix of a second metal oxide of at least one member selected from the group consisting of alumina, zirconia, titania, iron oxides, oxides of rare earth elements, alkali metal oxides and alkali earth metal oxides,
wherein the matrix is a nanoporous metal oxide material with nanopores whose diameters are 10 nm or less.

The nanoporous metal oxide materials according to the present invention preferably have nanopores with diameters of 5 nm or less and more preferably nanopores with diameters of 2 nm or less.

The first metal oxide powder is desirably sealed in the matrix and is supported on the surface of the substrates in the catalyst supports according to the present invention.

Moreover, the catalyst support of the present invention may further comprise (i) a noble metal supported on the surface of the first metal oxide powder and/or (ii) a noble metal supported on the surface of the coating.

The catalyst support of the present invention is that comprising, as matrix, such a nanoporous metal oxide material which has nanopores and which is not conventionally present and only became available by the producing methods of the present invention described below.

A method to produce catalyst supports of the present invention is a method for producing a catalyst support comprising a substrate, and coating formed on the surface of the substrate and including powder of a first metal oxide of at least one member selected from the group consisting of alumina, zirconia, titania, iron oxides, oxides of rare earth elements, alkali metal oxides and alkali earth metal oxides,
wherein the coating is obtained by heat treating the substrate after applied with a coating composition obtained by mixing the first metal oxide powder together with a fluid raw material composition containing a raw material of a second metal oxide of at least one member selected from the group consisting of alumina, zirconia, titania, iron oxides, oxides of rare earth elements, alkali metal oxides and alkali earth metal oxides, at a shear rate of 1000 sec$^{-1}$ or higher.

In the method to produce catalyst supports of the present invention, the coating includes the powder of the first metal oxide and the matrix of the second metal oxide, and the matrix is a nanoporous metal oxide material with nanopores whose diameters are 10 nm or less.

Moreover, in the method of producing catalyst supports of the present invention, the raw material of the second metal oxide is preferably at least one member selected from the group consisting of colloidal particles of alumina, zirconia, titania, iron oxides, oxides of rare earth elements, alkali metal oxides and alkali earth metal oxides, and salts of aluminum, zirconium, titanium, iron, rare earth elements, alkali metals and alkali earth metals.

Moreover, the fluid raw material composition is, more desirably either (i) a colloidal solution containing at least one member selected from the group consisting of colloidal particles of alumina, zirconia, titania, iron oxides, oxides of rare earth elements, alkali metal oxides and alkali earth metal oxides, or (ii) a metal salt solution containing at least one member selected from the group consisting of salts of aluminum, zirconium, titanium, iron, rare earth elements, alkali metals and alkali earth metals.

In the method of producing catalyst supports of the present invention, it is more desirable to mix the powder together with the fluid raw material composition at a shear rate of 10000 $sec^{-1}$ or higher.

In the method of producing catalyst supports of the present invention, it is particularly desirable that the second metal oxide is a matrix and the first metal oxide powder is sealed in the matrix and is supported on the surface of the substrate.

Moreover, the method of producing catalyst supports of the present invention may further include (i) a step to support a noble metal on the surface of the first metal oxide powder and/or (ii) a step to support a noble metal on the surface of the coating; thereby making it possible to obtain catalysts comprising a noble metal supported on the catalyst support efficiently as well as reliably.

Average particle size of the first metal oxide powder is desirably in the range of 0.01 to 50 μm. Additionally, the content of the first metal oxide powder is desirably in the range of 10 to 60 weight % of the total amount of metal oxides constituting the coating.

Although usage of catalyst supports obtained by the present invention described so far is not particularly limited, the aforementioned catalyst supports are most preferably catalyst supports for hydrogen production reaction since catalysts obtained by use of such catalyst supports exhibit marked improvements in reforming performances in hydrogen production reaction.

According to the present invention, it is possible to provide catalyst supports achieving high adhesion to various substrates like honeycomb filters in spite of the presence of metal oxide powder in the coating, and sufficient improvements in reforming performances in the hydrogen production reaction and so on, and also to provide their producing method.

DETAILED DESCRIPTIONS OF THE PREFERRED EMBODIMENTS

Figure 1:
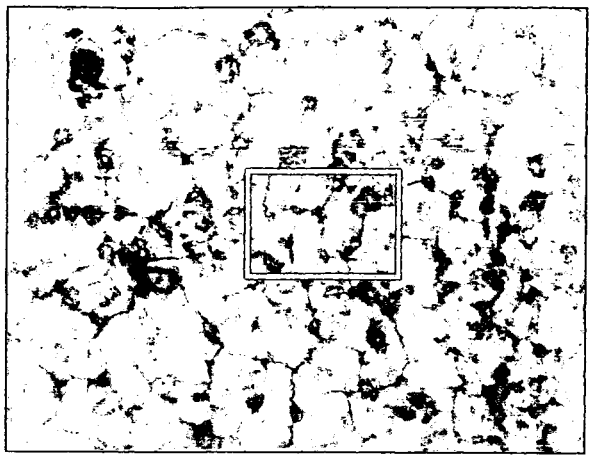
FIG. 1 is an electron micrograph showing the surface of metal oxide coating obtained in Example 2.

Present invention will be described below in detail according to the preferred embodiments.

Firstly, catalyst supports of the present invention will be described. A catalyst support of the present invention comprises;

a substrate, and coating formed on the surface of the substrate and including powder of a first metal of at least one member selected from the group consisting of alumina, zirconia, titania, iron oxides, oxides of rare earth elements, alkali metal oxides and alkali earth metal oxides, and a matrix of a second metal oxide of at least one member selected from the group consisting of alumina, zirconia, titania, iron oxides, oxides of rare earth elements, alkali metal oxides, and alkali earth metal oxides, wherein the matrix is a nanoporous metal oxide material with nanopores whose diameters are 10 nm or less.

Metal oxides (first and second metal oxides) constituting coating of catalyst supports of the present invention are at least one member of metal oxides selected from the group consisting of alumina, zirconia, titania, iron oxides, oxides of rare earth elements, alkali metal oxides and alkali earth metal oxides. Examples of oxides of rare earth elements include oxides of cerium, lanthanum, neodymium, yttrium and praseodymium. Examples of alkali metal oxides include oxides of lithium, sodium, potassium and cesium. Examples of alkali earth metal oxides include oxides of barium, strontium, calcium and magnesium.

From the viewpoint that catalyst supports obtained would be useful as catalyst supports for hydrogen production reaction and for exhaust gas purification and so on, at least one member of metal oxides selected from the group consisting of alumina, zirconia, titania, iron oxides, ceria, lanthana, neodymia, yttria, barium oxide, lithium oxide and potassium oxide is preferable as such metal oxides according to the present invention, and metal oxides containing at least one member selected from the group consisting of alumina, zirconia, ceria and titania are especially preferable.

Moreover, metal oxides according to the present invention can be either one member of metal oxide or compound metal oxides consisted of more than two members of metal oxides. Combinations of more than two members of metal oxides constituting such compound metal oxides are not particularly limited. However, from the viewpoint that the obtained catalyst supports would be useful as, for example, catalyst supports for hydrogen production reaction and purification of exhaust gas and so on, combinations of alumina/ceria/zirconia, alumina/zirconia/titania, alumina/zirconia/lanthana, zirconia/lanthana, zirconia/neodymia, zirconia/yttria, zirconia/titania, ceria/zirconia, alumina/zirconia/yttria, ceria/zirconia/yttria, alumina/ceria, alumina/zirconia, alumina/titania, alumina/lanthana, alumina/ceria/zirconia/yttria, alumina/ceria/zirconia/neodymia, alumina/ceria/zirconia/lanthana, alumina/ceria/zirconia /lanthana/praseodymium oxide, alumina/ceria/zirconia/lanthana/neodymia, alumina/ceria/zirconia/lanthana/neodymia/yttria, alumina/iron oxides, ceria/iron oxides, alumina/ceria/iron oxides, zirconia/iron oxides, alumina/zirconia/iron oxides, and so on are preferable, and among them, combinations of alumina/ceria/zirconia, alumina/zirconia/titania, alumina/zirconia/lanthana, zirconia/lanthana, zirconia/neodymia, zirconia/yttria, zirconia/titania, ceria/zirconia, alumina/zirconia/yttria, ceria/zirconia/yttria, alumina/ceria, alumina/zirconia, and alumina/iron oxides are especially preferable.

Furthermore, from the viewpoint that the obtained catalyst supports would be suitable as materials for catalysts to purify exhaust gas and especially for catalysts used under excess oxygen conditions, for combinations of more than two members of metal oxides constituting such compound metal oxides, combinations of alumina/potassium oxide, alumina/barium oxide, barium oxide/potassium oxide, barium oxide/sodium oxide, barium oxide/lithium oxide, barium oxide/potassium oxide/lithium oxide, titania/barium oxide, titania/barium oxide/potassium oxide, titania/barium oxide/sodium oxide, titania/barium oxide/lithium oxide, titania/barium oxide/potassium oxide/sodium oxide, titania/barium oxide/potassium oxide/lithium oxide, titania/barium oxide/potassium oxide/lithium oxide/sodium oxide, and titania/barium oxide/potassium oxide/strontium oxide are preferable, and among them, combinations of alumina/potassium oxide, alumina/barium oxide, barium oxide/potassium oxide, barium oxide/lithium oxide, barium oxide/potassium oxide/lithium oxide, titania/barium oxide, titania/barium oxide/potassium oxide, titania/barium oxide/lithium oxide are especially preferable.

It should be noted composition ratio of metal oxides in such various compound metal oxides is not particularly limited and is adjusted in accordance with their usage where appropriate.

In the catalyst support of the present invention, coating formed on a substrate is consisted of the first metal oxide powder and a matrix of second metal oxides and the matrix is a nanoporous metal oxide material with nanopores whose diameters are 10 nm or less.

Such nanoporous metal oxide material of the present invention is consisted of at least one member of the aforementioned metal oxide with microscopic pores whose diameters are 10 nm or less, preferably 5 nm or less, and more preferably 2 nm or less. For this reason, in the catalyst support of the present invention, improvements in adhesion to various substrates and heat tolerance (heat resistance) are possible compared to porous metal oxide materials without such microscopic pores. Furthermore, improvements in performance as catalyst supports are achieved due to increase in specific surface area and improvements in stability in supporting noble metals and so on in the nanoporous metal oxide materials of the present invention.

Moreover, first metal oxide powder contained in the matrix formed of the second metal oxide is powder of at least one member of the aforementioned metal oxides in the catalyst support of the present invention. Materials for such metal oxide powder are not particularly limited. However, it is possible to support even low aggregative metal oxide powder with low film formability, with high adhesion to substrates according to the present invention. Therefore, it is desirable to use various metal oxide powder such as zirconia, ceria and titania, exerting catalytic function despite its low aggregative property and low film formability, and encourage its usage.

Moreover, the average particle size of the first metal oxide powder is preferably in the range of 0.01 to 50 μm and more preferably in the range of 0.1 to 10 μm. Powder with its average particle size smaller than the lower limit is difficult to produce by grinding of metal oxides. On the other hand, when the average particle size of powder exceeds the upper limit, coating thickness becomes highly thick and adhesion tends to deteriorate. A material obtained by drying the solution containing a salt of a metal to be oxidized to the first metal oxide followed by the grinding of the resultant, is preferably used as the first metal oxide powder. Moreover, its average particle size is desirably equal to or less than the thickness of coating to be obtained.

Furthermore, it is also possible to support a noble metal on the surface of such first metal oxide powder in advance. Examples of such a noble metal include platinum, rhodium, palladium, osmium, iridium, and gold. However, from the viewpoint that catalyst support obtained would be useful as catalyst supports for hydrogen production reaction and for exhaust gas purification and so on, platinum, rhodium and palladium are preferable. The amount of such a noble metal to be supported is not particularly limited and is adjusted depend on the usage of obtained catalytic support and so on where appropriate. However, the amount of approximately 0.1 to 10 weight parts relative to 100 weight parts of metal oxides constituting the obtained coating is generally adopted. Specific methods to support such a noble metal are not particularly limited either. For example, a method immersing the aforementioned powder into solution obtained by dissolving a salt (such as nitrate, chloride and acetate) of a noble metal or a complex of a noble metal in a solvent such as water or alcohol, followed by the removal of solvent, and calcinating and grinding of the resultant is preferably applied. It should be noted that when solvent is removed in the step to support the noble metal, drying conditions of 30 to 150° C. for about 10 minutes or less and calcination conditions of 250 to 300° C. for about 30 to 60 minutes in an oxidizing atmosphere (for example, air) are preferable. Moreover, it is also possible to repeat such noble metal-supporting step until the desired supporting amount is achieved.

The first and second metal oxides according to the present invention can be one member of metal oxide or a combination of more than two members of metal oxides. Preferable conditions for such combination are in accordance with preferable conditions of metal oxides constituting the coating and their combinations.

Moreover, the amount of the first metal oxide powder to be supported on a substrate in the present invention is not particularly limited. However, the proportion of the first metal oxide powder contained in the obtained coating is preferably 10 to 60 weight % relative to the total amount of metal oxides constituting the coating and more preferably 15 to 55 weight %. When the proportion of metal oxide powder contained in the obtained coating is lower than the lower limit, improvements in reforming performances are not sufficiently achieved. On the other hand, adhesion to various substrates tends to deteriorate when the proportion exceeds the upper limit.

Substrates used in the present invention are not particularly limited. Monolith support substrates (e.g. honeycomb filters, high density honeycombs), foam filter substrates, pellet substrates, and plate substrates are suitably adopted. Moreover, properties of materials used for such substrates are not particularly limited either. Substrates made of ceramics such as cordierite, silicon carbide and mullite, as well as substrates made of metals such as stainless steel containing chromium and aluminum are suitably adopted. It should be noted that when metal substrates are used, heat treatment at 300 to 1000° C. for approximately 1 to 10 hours is preferably carried out to form oxide film on the surface thereof in advance, since adhesion tends to further improve.

Additionally, the thickness of aforementioned coating formed on the surface of the substrate in the present invention is not particularly limited and is adjusted according to the substrate used, usage of obtained catalyst and so on where appropriate. However, the coating thickness is preferably approximately 1 to 300 μm and more preferably 1 to 50 μm, since it is possible to form coating with excellent adhesion to various substrates like metallic honeycomb filters even when the thin coating is formed according to the present invention.

Furthermore, it is possible to form coating with reduced film thickness on the surface of the substrate according to the present invention. Therefore, it is possible to form coating with high level of adhesion even to high density (high integration) honeycombs on which forming sufficient coating has been conventionally difficult. Thus, coating thickness of approximately 1 to 30 μm is especially preferable from such a point of view.

Catalyst supports of the present invention have been described so far. It is also possible to further support a noble metal on the surface of the catalyst support of the present invention. Although such a noble metal can be platinum, rhodium, palladium, osmium, iridium, gold, and so on and is not particularly limited, platinum, rhodium and palladium are preferable among them. Moreover the amount of supported noble metal is not particularly limited and is adjusted depend on usage of the obtained catalyst and so on where appropriate. However, the amount of approximately 0.1 to 10 weight parts relative to 100 weight parts of the metal oxides constituting the catalyst support is generally adopted.

The method of producing the catalyst supports of the present invention will be described next. In the method of producing the catalyst supports of the present invention, the aforementioned coating is obtained by the following procedures; firstly the above described first metal oxide powder is mixed together with a fluid raw material composition containing a raw material of the second metal oxide described below at a shear rate of 1000 sec$^{-1}$ or higher, and then the resulted coating composition was applied onto the substrate followed by heat treatment.

At least one member selected from the group consisting of colloidal particles of alumina, zirconia, titania, iron oxides, oxides of rare earth elements, alkali metal oxides and alkali earth metal oxides, and salts of aluminum, zirconium, titanium, iron, rare earth elements, alkali metals and alkali earth metals is suitable as the raw material for the second metal oxide used in the present invention.

Moreover, (i) a colloidal solution containing at least one member selected from the group consisting of colloidal particles of alumina, zirconia, titania, iron oxides, oxides of rare earth elements, alkali metal oxides and alkali earth metal oxides, or (ii) a metal salt solution containing at least one member selected from the group consisting of salts of aluminum, zirconium, titanium, iron, rare earth elements, alkali metals and alkali earth metals, is preferably used as the fluid raw material composition according to the present invention.

Firstly, the colloidal solution according to the present invention will be described. The colloidal particle according to the present invention is that of the second metal oxide; i.e. at least one member of metal oxide selected from the group consisting of alumina, zirconia, titania, iron oxides, oxides of rare earth elements, alkali metal oxides and alkali earth metal oxides; with average particle size of 5 to 200 nm, preferably 5 to 100 nm. As for the colloidal particles with average particle size smaller than 5 nm, preparing particles with a size not greater than that of a single metal oxide is difficult in principle. On the other hand, various problems such as degradation in dispersibility, adhesion, and reactivity will arise when the particle size exceeds 200 nm.

Shapes of such colloidal particles are not particularly limited here and examples include acicular particles, rod particles, feathery particles, spherical particles, and particles of indeterminate forms. Additionally, solvent for adjusting concentration of the colloidal solution is not particularly limited either and water, alcohol, and so on are used and the solvent to be used is determined by considering the amount of supported metal oxide at one procedure and the like.

Moreover, when obtaining a matrix consisted of more than two members of metal oxides in the present invention, part of these metal oxides can be further contained in the colloidal solution as a solution of an element constituting the metal oxide. A solution dissolving a salt (such as nitrate, acetate, chloride, sulfate, sulfite and inorganic complex salt) of a metal which is constituting an element of the metal oxide, in a solvent such as water and alcohol, are preferably used as such solution.

Next, the metal salt solution according to the present invention will be described. The metal salt used as the raw material in the present invention is a component to become the aforementioned second metal oxide by calcination process described later; i.e. salt of at least one metal selected from the group consisting of aluminum, zirconium, titanium, iron, rare earth elements, alkali metals and alkali earth metals.

Moreover, water-soluble salts such as nitrates, acetates, chlorides, sulfates, sulfites, and inorganic complex salts of the above-described metals (e.g. aluminum nitrate, zirconium oxynitrate, cerium nitrate, zirconium acetate, zirconium oxysulfate, titanium tetrachloride, ammonium titanyl oxalate, titanyl sulfate, ytterium nitrate) are preferably used as the metal salts according to the present invention.

Furthermore, a solvent for preparing a solution containing the metal salt according to the present invention is not particularly limited and various solvents such as water and alcohol (e.g. solvents consisted of methanol, ethanol, and ethylene glycol singly and/or combination of them) are used. In the viewpoint of enhancing the adhesion for metal substrates, mixed solvents of water and alcohol are preferable and those containing alcohol of 40 to 100% by weight are more preferable, and those containing alcohol of 55 to 80% by weight are especially preferable. Moreover, although pH of the metal salt solution according to the present invention is not particularly limited, metal salt solutions with pH of 3.0 to 6.0 are preferable from the viewpoints that metal ions exist more stably in the solution.

In the method of producing catalyst support of the present invention, a fluid raw material composition containing a raw material of the second metal oxide is mixed together with the first metal oxide powder at a shear rate of 1000 sec$^{-1}$ or higher. The coating is obtained by the application of the resulting coating composition onto the substrate followed by heat treatment.

In other words, a coating composition is obtained by first mixing a fluid raw material composition containing a raw material of the second metal oxide together with the first metal oxide powder at a shear rate of 1000 sec$^{-1}$ or higher, more preferably 10000 sec$^{-1}$ or higher, and especially preferably 20000 sec$^{-1}$ or higher. When such shear rates are lower than 1000 sec$^{-1}$, sufficient improvements in adhesion to substrates are not achieved. Note that such shear rates are preferably 200000 sec$^{-1}$ or less although the upper limit for such shear rates is not particularly limited.

Although equipments used here are not particularly limited as long as they are usable for mixing at high shear rates, homogenizers are suitably used. Moreover, mixing time at such high shear rates is not particularly limited either, although approximately 1 to 20 minutes (preferably 1 to 5 minutes) of mixing time is common.

Concentrations (solid concentration) of solutions (dispersions) containing the first metal oxide powder and fluid raw material composition containing raw material of the second metal oxide mixed at such high shear rates, are adjusted depend on the thickness of the coating to be obtained and viscosity suited for the application method and so on where appropriate. Generally, solid concentration is approximately 5 to 50% by weight and preferably is approximately 10 to 15% by weight.

Additionally, further degassing treatment can be carried out in the present invention by gently stirring (e.g. 20 to 100 rpm) the mixed fluid raw material composition for about 1 to 2 minutes in order to remove air bubbles in the obtained coating composition.

In the coating composition according to the present invention described above, various components of raw material of the second metal oxide (colloidal particles and/or metal salts) are dispersed extremely homogeneously (uniformly). By heat treating the substrate after the application of such coating composition practically without precipitation, it is possible to form the metal oxide coating with high adhesion to various substrates like honeycomb filters. Therefore, the second metal oxide will become matrix for the first metal oxide powder, and metal oxide powder sealed in the matrix will be supported on the surface of the substrates. Thus, interparticle force and adhesion to substrates are independent of metal powder, and the powder is fixed onto the surface of the substrates by the metal oxide functioning as matrix. Hence, it is possible to form homogeneous metal oxide coating of thin film containing metal oxide powder with high level of adhesion to substrates such as metallic honeycomb filters and high density honeycombs, according to the producing method of the present invention.

As described above, it is desirable to heat-treat the substrates after the application of the coating composition without practical precipitation. The phrase "without practical precipitation" describes the state where metal elements in the fluid raw material composition become metal oxides by the heat treatment practically without going through the state of metal hydroxides. More specifically, the phrase describes the case where ratio of metal hydroxides in metal components in the fluid raw material composition before the heat treatment is 50 at % or less (more desirably 30 at % or less).

Intended catalyst supports are obtained by mixing the coating composition at the aforementioned high shear rates, then applying the coating composition onto substrates, and heat treating the resultant without practical precipitation in the method of producing catalyst supports of the present invention. Moreover, when metal salt solution is used as the fluid raw material composition, catalyst supports of the present invention described above will be obtained by oxidizing metal component in the fluid raw material composition to metal oxide with such heat treatment.

In the present invention, the coating composition is preferably heat treated rapidly after the mixing and application. Specific method for such heat treatment is not particularly limited. However, a method of rapidly drying the coating composition after its mixing and application, and further calcinating where necessary, is preferably adopted.

In the present invention, time spent between the mixing of the coating composition at a high shear rate and the heat treatment of the coating composition is desirably as short as possible, preferably within about 60 minutes and more preferably within about 30 minutes. When the time exceeds the upper limit, metal oxides aggregate before and during the heat treatment step due to the reduction in the effect of stirring at high shear rates. Accordingly, it becomes difficult to obtain coating with sufficiently improved adhesion and heat tolerance.

Moreover, it is desirable to dry the coating composition rapidly before calcination by removing solvents although the calcination process described later may include a drying process. Drying condition of temperature of about 60 to 180° C. within 10 minutes is more preferable in that case and drying condition of temperature of 100 to 150° C. within 5 minutes is especially preferable. When the drying temperature is lower than the lower limit, rapid drying is unlikely to be achieved. On the other hand, when the drying temperature exceeds the upper limit, drying rate becomes too fast and evaporation rate of water far exceeds the film formation rate causing cracks and fractures, and resulting in the considerable reduction in adhesion. Moreover, when the drying time exceeds the upper limit, metal oxides aggregate during drying process due to the reduction in effect of stirring at high shear rates, and it becomes unlikely to obtain coating with sufficiently improved adhesion and heat tolerance. Note that coating composition should preferably be dried until the proportion of water content becomes 200 weight % or less (especially preferably 100 weight % or less) in such rapid drying process.

Furthermore, calcinating in oxidizing atmosphere (for example, air) for 20 to 70 minutes (especially preferably 30 to 60 minutes) at the temperature of 250 to 600° C. (especially preferably temperature of 350 to 500° C.) is more preferable as the calcination conditions. When the calcinating temperature is lower than the lower limit, sufficient calcination is not achieved and the coating with sufficiently improved adhesion and heat tolerance is unlikely to be obtained. On the other hand, when the calcinating temperature exceeds the upper limit, reduction in sintering performance and so on tends to occur due to the high temperature oxidizing atmosphere. Moreover, when the calcinating time is lower than the lower limit, sufficient calcination is not achieved and the coating with sufficiently improved adhesion and heat tolerance is unlikely to be obtained. On the other hand, when the calcinating time exceeds the upper limit, metal oxides aggregate during the calcinating process due to the reduction in effect of stirring at high shear rates, and it becomes unlikely to obtain coating with sufficiently improved adhesion and heat tolerance.

The amount of coating composition applied onto substrates in the present invention is not particularly limited, and is adjusted depend on the type of substrates used and usage of obtained catalysts and so on where appropriate. The preferable amount of metal oxides constituting the coating is 10 to 300 g relative to 1 liter of substrate volume.

Specific method to apply the coating composition onto substrates is not particularly limited in the present invention. For example, a method of immersing substrates in the coating composition, and a method of applying the coating composition onto substrate surface by sprays and so on are preferably adopted.

In addition, it is possible to repeat the step of applying the coating composition onto substrates until the desirable amount was supported. In this case, substrates are preferably precalcinated after the application and drying of the coating composition. Precalcinating at the temperature of 250 to 300° C. for 30 to 60 minutes in an oxidizing atmosphere (e.g. air) is especially preferable as the precalcination conditions in this case.

Next, a method to obtain catalysts for hydrogen production reaction and exhaust gas purification using the catalyst supports obtained by the producing method of the present invention will be described. That is, the producing method of the present invention may further include a step to support a noble metal on the coating surface.

Specific method to support such a noble metal is not particularly limited. For example, a method firstly immersing the catalyst supports in a solution obtained by dissolving a noble metal salt (e.g. nitrate, chloride acetate) or a noble metal complex in a solvent such as water and alcohol, and then canlcinating the resultant after the removal of solvent, is preferably adopted. Note here that drying conditions of 30 to 150° C. for approximately 10 minutes or less and calcination conditions of 250 to 300° C. for approximately 30 to 60 minutes in an oxidizing atmosphere (e.g. air) are preferable when removing solvent in the step to support the noble metal. Additionally, it is possible to repeat such step to support the noble metal until the desired amount is supported.

EXAMPLES

The present invention will be specifically described below based on Examples and Comparative Examples although the present invention is not limited to the Examples described below.

Here, TK Robo Mics manufactured by Tokusyu Kika Kogyo Co., Ltd. (TK Homo Mixer MARKII 2.5 for the stirring parts) was used as a homogenizer.

Moreover, materials described below were respectively used as alumina ($Al_2O_3$) colloid, zirconia ($ZrO_2$) powder, Al solution, Zr solution, Ce solution, and Rh solution.

$Al_2O_3$ colloid . . . average particle size: 5 to 20 nm, acicular particle, nitrate water solution (solid concentration: 25 weight %), $ZrO_2$ powder . . . average particle size: 1 µm, Al solution . . . aluminum nitrate water solution (solid concentration: 5.44 weight %)

Zr solution . . . zirconium oxynitrate water solution (solid concentration: 18 weight %)

Ce solution . . . cerium nitrate water solution (solid concentration: 28 weight %)

Rh solution . . . rhodium nitrate water solution (solid concentration: 3 weight %)

Further, high density metallic honeycomb (Fe-20Cr-5Al) of 1200 cell/inch$^2$ was used as a substrate for electron microscopy and evaluation of reforming performances. In addition, a metal plate made of stainless steel containing Cr and Al (Fe-20Cr-5Al, 50 mm×50 mm×0.3 mm) which was heat treated for one hour at 1000° C. in advance to form oxide coating film on the surface thereof, a cordierite plate (50 mm×50 mm×1 mm), and an SiC plate (50 mm×50 mm×1 mm) were used as substrates to evaluate adhesion.

Examples 1 to 2 and Comparative Examples 1 to 2

$Al_2O_3$ colloid, Zr solution, $ZrO_2$ powder, and Ce solution were mixed in the proportion (calculated as solid content) shown in Table 1, and then diluted with methanol to prepare a solution (or a dispersion) with a solid concentration of 12 weight %. Obtained solution was mixed for 2 minutes with the homogenizer at a shear rate of 20000 sec$^{-1}$, and then gently mixed (stirring rate of 20 rpm) for about one minute to remove air bubbles from the resulting solution thereby to obtain a coating composition.

Subsequently, each of the substrates was immediately immersed in the obtained coating composition described above for 1 to 10 seconds and excessive coating composition was removed by gravity and shaking after the substrate was pulled out. After being placed horizontally, the substrate was gently dried at room temperature for 5 to 10 minutes, dried with warm air (60 to 100° C.) at a wind velocity of 2 to 5 m/s for 5 to 10 minutes, precalcinated at 250° C. for approximately 30 minutes in the air atmosphere, and further cooled for 5 to 10 minutes with normal temperature air at a wind velocity of 2 to 5 m/s. After repeating such treatments twice, the substrates were calcinated for approximately 60 minutes at 500° C. in the air atmosphere, and the catalyst supports with metal oxide coating formed on the substrate surface were obtained.

TABLE 1

| Example/Comparative Example | Composition No. | Material (Wt %) | | | |
|---|---|---|---|---|---|
| | | $Al_2O_3$ colloid | Zr solution | $ZrO_2$ powder | Ce solution |
| Example 1 | 1 | | 45 | 55 | |
| Comparative Example 1 | 2 | | 100 | | |
| Example 2 | 3 | 35 | 13.5 | 16.5 | 35 |
| Comparative Example 2 | 4 | 35 | 30 | | 35 |

Examples 3 to 5 and Comparative Examples 3 to 4

Catalyst supports with metal oxide coating formed on the substrate surface were obtained as the same manner as that described in Example 1 except the mixing of Zr solution and $ZrO_2$ powder in the proportion (converted to solid content) shown in Table 2.

TABLE 2

| Example/Comparative Example | Composition No. | Material (Wt %) | |
|---|---|---|---|
| | | Zr solution | $ZrO_2$ powder |
| Comparative Example 3 | 5 | 100 | 0 |
| Example 3 | 6 | 50 | 50 |
| Example 4 | 7 | 46 | 54 |
| Example 5 | 8 | 40 | 60 |
| Comparative Example 4 | 9 | 0 | 100 |

Example 6

Catalyst supports with metal oxide coating formed on the substrate surface were obtained as the same manner as that described in Example 3 except the use of Al solution instead of Zr solution and the mixing of Al solution and $ZrO_2$ powder in the proportion of 50:50 (converted to solid content, weight ratio).

Example 7

Catalyst supports with metal oxide coating formed on the substrate surface were obtained as the same manner as that described in Example 3 except the use of $Al_2O_3$ colloid instead of Zr solution and the mixing of $Al_2O_3$ colloid and $ZrO_2$ powder. in the proportion of 50:50 (converted to solid content, weight ratio).

Comparative Example 5

Catalyst supports with metal oxide coating formed on the substrate surface were obtained as the same manner as that described in Example 2 except the gentle stirring by a propeller (a shear rate of 10 sec$^{-1}$ or lower) instead of using a homogenizer.

<Electron Microscopy>

The surfaces of the metal oxide coatings obtained in Example 2 and Comparative Example 2 are observed by an electron microscope (600× magnification). FIG. 1 shows an electron micrograph of the surface of metal oxide coating obtained in Example 2, FIG. 2 shows an enlarged electron micrograph of a part enclosed by the frame in FIG. 1, and FIG. 3 shows an electron micrograph of the surface of metal oxide coating obtained in Comparative Example 2, respectively.

Figure 2:
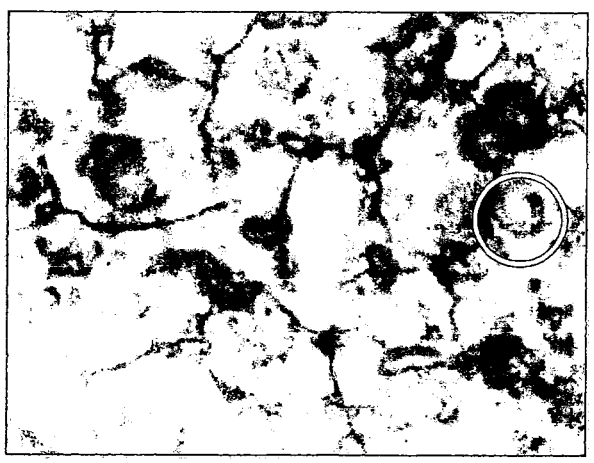
FIG. 2 is an enlarged electron micrograph of a part enclosed by a frame in the electron micrograph of FIG. 1.
Figure 3:
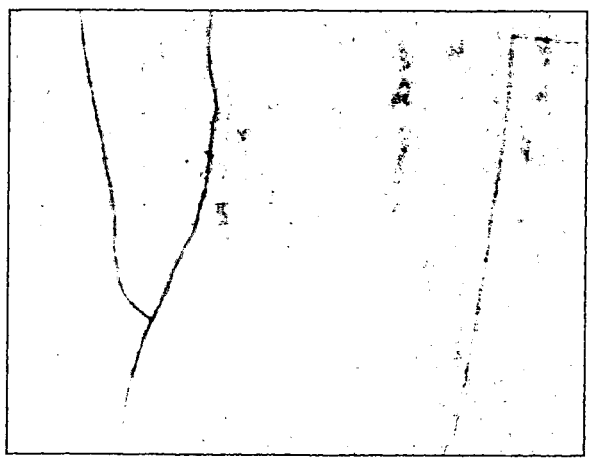
FIG. 3 is an electron micrograph showing the surface of metal oxide coating obtained in Comparative Example 2.

As is apparent from the results shown in FIGS. 1 and 2, $ZrO_2$ particles in a sealed state inside the metal oxide coating was confirmed when $ZrO_2$ powder was added (Example 2).

<Reforming Performance Test>

Reforming performances of catalysts obtained by using catalyst supports with metal oxide coating supported on the metallic high density honeycombs with the methods described in Examples 1 to 2 and Comparative Examples 1 to 2 were evaluated as described below. In other words, each high density honeycomb supporting metal oxide coating was firstly immersed in Rh solution for one hour, pulled out, and then the excessive solution on its surface was removed by gravity and shaking. Subsequently, after being placed horizontally, the metallic high density honeycomb was gently dried at room temperature for 5 to 10 minutes, dried with warm air (60 to 100° C.) at a wind velocity of 2 to 5 m/s for 5 to 10 minutes, calcinated at 300° C. for approximately 60 minutes in the air atmosphere, and further cooled for 5 to 10 minutes with normal temperature air at a wind velocity of 2 to 5 m/s. After repeating such treatments three times, each metallic high density honeycomb supporting metal oxide coating supported 0.1 g of rhodium and thus, the catalysts for hydrogen production reaction were obtained.

Figure 4:
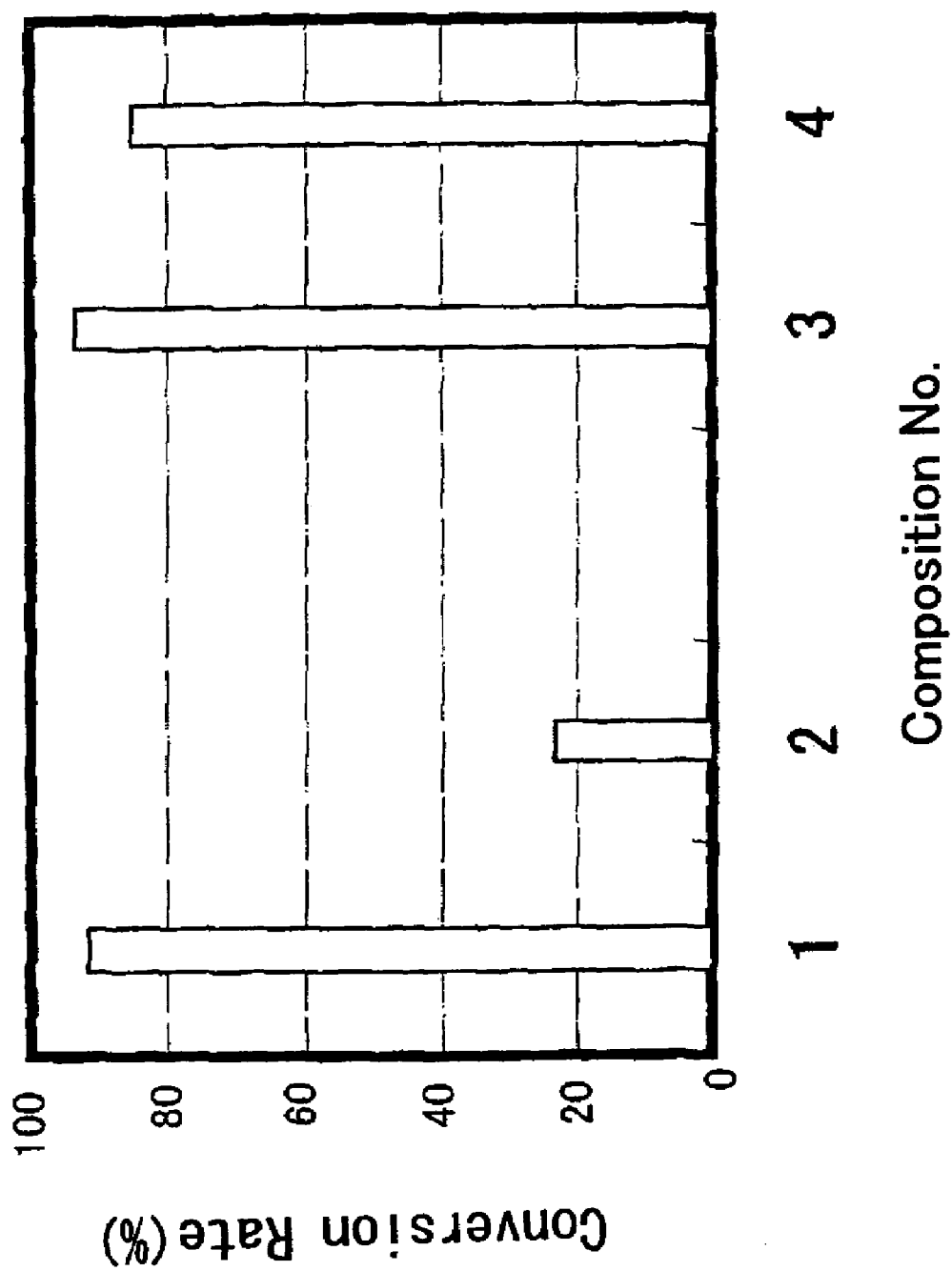
FIG. 4 is a graph showing the result of reforming performance test (conversion rate).
Figure 5:
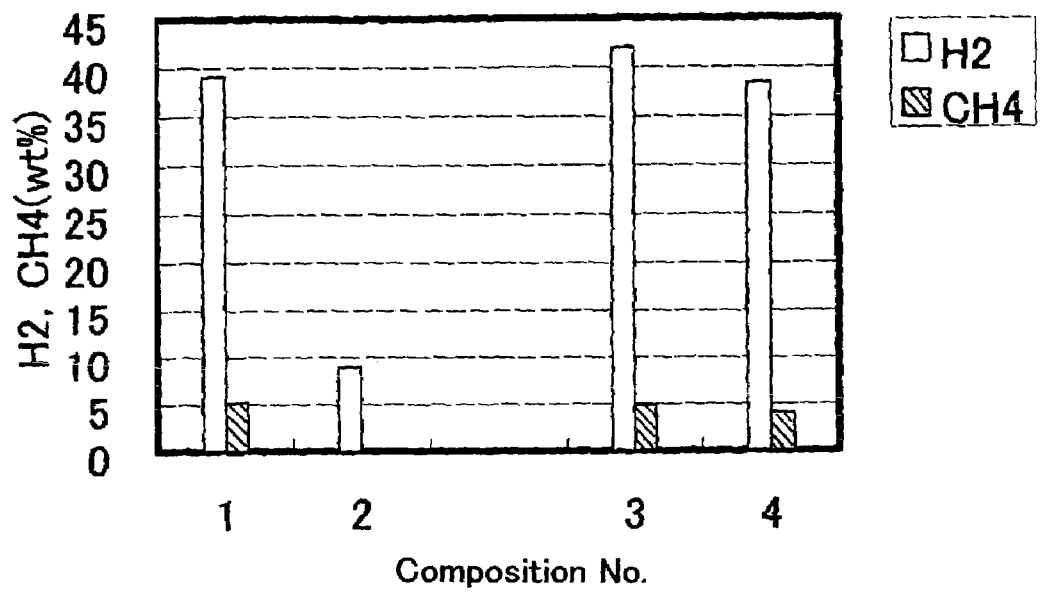
FIG. 5 is a graph showing the result of reforming performance test (concentrations of hydrogen and methane).

Then, each of the catalysts for hydrogen production reaction obtained in such a way was heated in an infra-red image furnace and reforming performance test was performed under conditions of space rate of 25000 $h^{-1}$, steam/carbon=2, and oxide/carbon=0.1 by use of isooctane as a reforming fuel. Moreover, as for temperature condition, outlet temperature was set to 550° C., and for measuring item, outlet gaseous components ($H_2$, CO, $CO_2$, $N_2$, $CH_4$, HC, and $H_2O$) were measured and conversion rates were calculated for each component according to its outlet concentration using the following equation. Obtained conversion rates are shown in FIG. 4. Additionally, concentrations of $H_2$ and $CH_4$ in the outlet gas are shown in FIG. 5. Conversion rate (%)=(carbon in CO, $CO_2$, and $CH_4$)/(carbon in isooctane)

As is apparent from the results shown in FIGS. 4 and 5, high conversion rate of 92% or higher and high $H_2$ concentration of 39% or higher by weight were achieved at the same time in the catalysts for hydrogen production reaction obtained by using catalyst supports (Examples 1 to 2) obtained by rapidly drying and calcinating the substrates, which were applied with the mixture of metal oxide powder and metal salt solutions mixed at a high shear rate. Thus, excellence of obtained catalysts in reforming performances was confirmed.

<Adhesion Test 1>

Adhesion of metal oxide coating (film thickness: approximately 5 μm) formed respectively on the metal plates by using methods described in Examples 3 to 5 and Comparative Examples 3 to 4 was evaluated as follows. That is, each substrate forming metal oxide coating on its surface was subjected to four times of ultrasonic vibration for 30 minutes by using ultrasonic cleaner and the remaining proportion (weight standard) of thin film during the process was measured.

Figure 6:
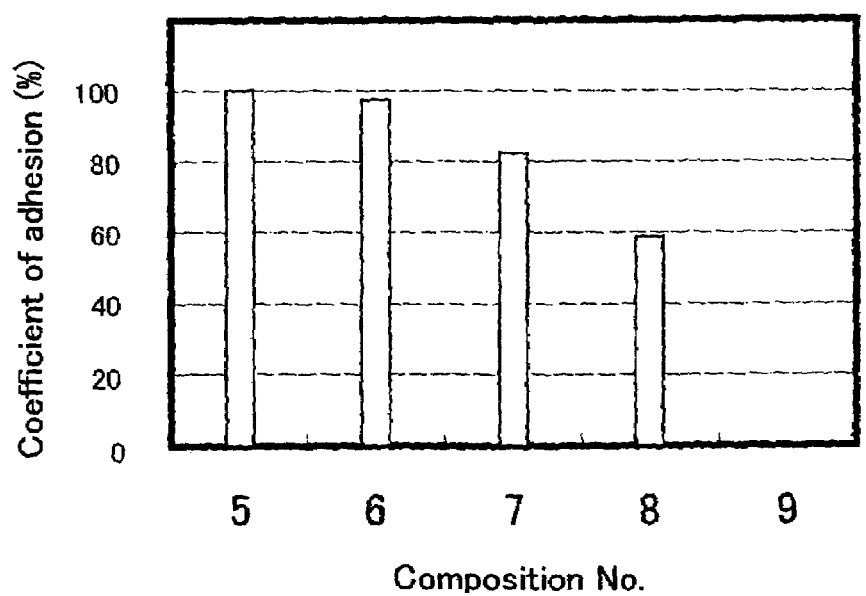
FIG. 6 is a graph showing the results of adhesion test (Examples 3 to 5 and Comparative Examples 3 to 4).

Obtained results are shown in FIG. 6. As is apparent from the results shown in FIG. 6, sufficient suppression of reduction in adhesion to substrates in catalyst supports (Examples 3 to 5) obtained by rapidly drying and calcinating the substrate applied with a mixture of metal oxide powder and metal salt solution mixed together at a high shear rate, was confirmed despite the inclusion of metal oxide powder.

<Adhesion Test 2>

Adhesion of metal oxide coating (film thickness: approximately 5 μm) formed respectively on the metal plates, the cordierite plates, and SiC plates, by using methods described in Example 2 and Comparative Example 5 was evaluated as follows. That is, each substrate forming metal oxide coating on its surface was subjected to four times of ultrasonic vibration for 30 minutes by using ultrasonic cleaner and the remaining proportion (weight standard) of thin film during the process was measured.

Figure 7:
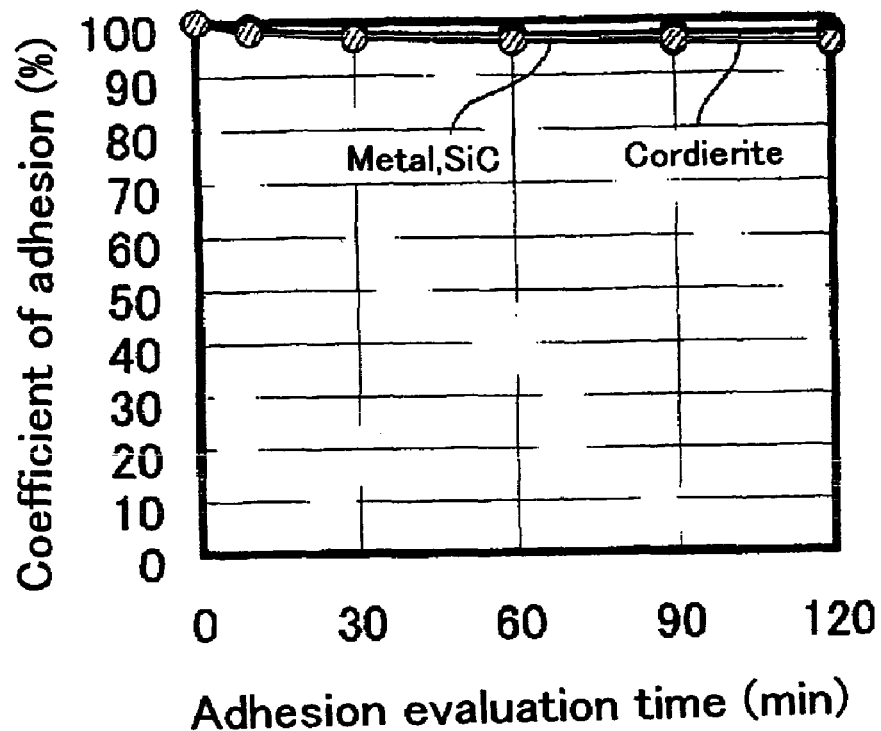
FIG. 7 is a graph showing the result of adhesion test (Example 2).
Figure 8:
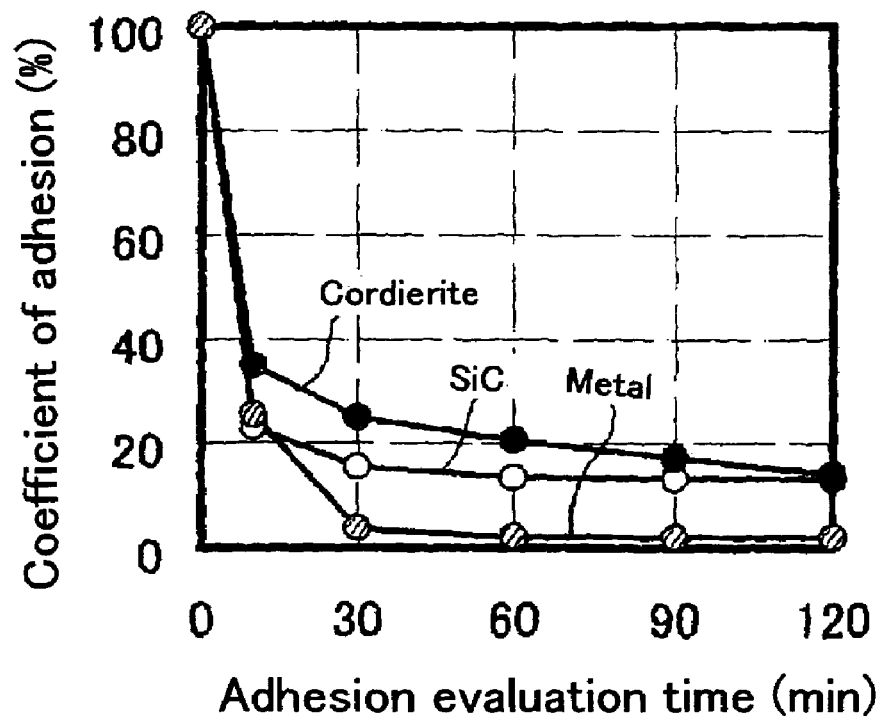
FIG. 8 is a graph showing the result of adhesion test (Comparative Example 5).

Obtained results are shown in FIGS. 7 (Example 2) and 8 (Comparative Example 5). As is apparent from the results shown in FIGS. 7 and 8, great improvements in adhesion to various substrates were confirmed in the catalyst supports obtained by rapidly drying and calcinating the substrate applied with a mixture of metal oxide powder and metal salt solutions mixed together at a high shear rate.

<Evaluation of Nanopores>

The presence of nanopores in the matrix part of the metal oxide coating obtained by methods described in Examples 3, 6 and 7 was confirmed by the small angle X-ray scattering method as described below. Note here that the obtained coating was removed from the substrates, grinded in a mortar, and the powdered matrix part was used as a sample.

Figure 9:
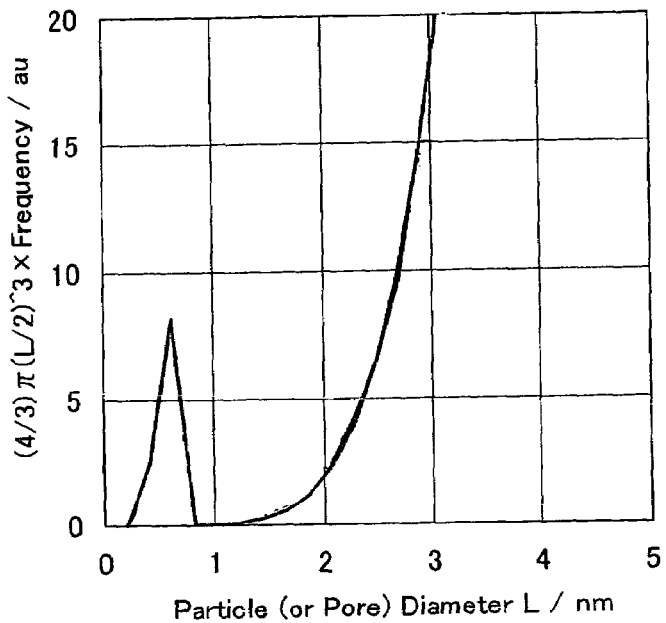
FIG. 9 is a graph showing the pore diameter distribution in the matrix in the coating obtained in Example 3.
Figure 10:
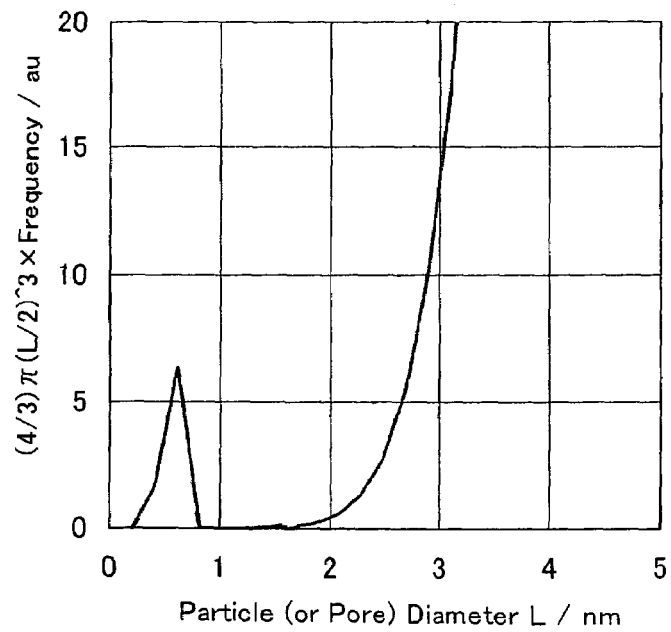
FIG. 10 is a graph showing the pore diameter distribution in the matrix in the coating obtained in Example 6.
Figure 11:
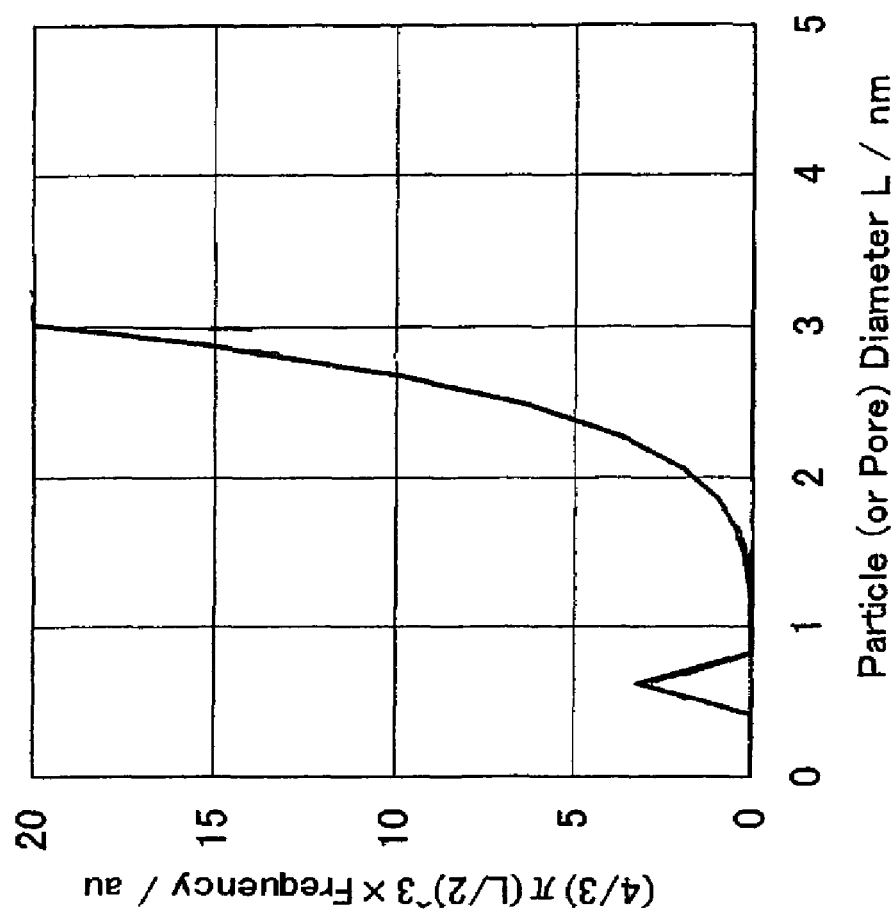
FIG. 11 is a graph showing the pore diameter distribution in the matrix in the coating obtained in Example 7.

That is, X-ray undulator beam line of excellent parallelism and energy density in a synchrotron radiation facility was used for the small angle X-ray scattering method. X-ray energy was set to 10 keV (wavelength 0.124 nm) and X-ray beam was squeezed to approximately 0.04 mm×0.04 mm by use of a four quadrant slit and making it the origin of beam for the small angle X-ray scattering method. Excessive scattering light was blocked by placing a pin hole with a diameter of 0.5 mm approximately 65 cm downstream from the origin and the sample was placed immediately downstream of the pin hole attaching to it. Absorption was calculated so that the intensity of X-ray after transmitting the sample was 1/e (e being the base of natural logarithm) and appropriate sample thickness was derived. Compact sample was prepared according to this sample thickness. An imaging plate was placed precisely 50 cm downstream (115 cm downstream from the origin) from the sample and the scattered X-ray was recorded. An attenuator with a cover glass was placed at the position of transmitting X-ray to prevent damages in the imaging plate as well as to record the position of transmitting X-ray at appropriate intensity on the imaging plate. Average value of X-ray intensity recorded on the concentric circle, which has a position of transmitting X-ray on the imaging plate as a center, was derived, and scattering angle was plotted against intensity by converting the radius of concentric circle to the angle for the analysis. An appropriate distribution capable of explaining the plot of scattering angle against intensity was found by appropriately changing the distribution of scatterer radius assuming a spherical scatterer in the sample. Measured results for the matrix part of metal oxide coating obtained by the methods described in Examples 3, 6 and 7 are shown in FIGS. 9 (Example 3), 10 (Example 6), and 11 (Example 7).

As is apparent from the results shown in these figures, matrices in the coating of the catalyst supports of the present invention obtained by the method of the present invention were confirmed as nanoporous metal oxide materials with considerably fine nanopores whose diameters are 2 nm or less.

As described so far, it is possible to produce catalyst supports having coating with high adhesion to various substrates like honeycomb filters despite the inclusion of metal oxide powder in the coating, and are also capable of sufficiently improving reforming performances in hydrogen production reaction and so on.

Therefore, the present invention is a considerably useful technology to obtain catalysts for hydrogen production reaction to generate hydrogen as a fuel in separation membrane cell systems like fuel cells, and for exhaust gas purification to purify toxic components emitted from internal combustion engines like automobiles.

What is claimed is:

1. A catalyst support, comprising:
   a substrate; and
   a coating on a surface of the substrate;
   said coating comprising
      powder of a first metal oxide of at least one member selected from the group consisting of alumina, zirconia, titania, iron oxides, oxides of rare earth elements, alkali metal oxides and alkali earth metal oxides, and
      a matrix of a second metal oxide of at least one member selected from the group consisting of alumina, zirconia, titania, iron oxides, oxides of rare earth elements, alkali metal oxides and alkali earth metal oxides,
      wherein the matrix is a nanoporous metal oxide material with nanopores whose diameters are 2 nm or less, and
      wherein an average particle size of powder of the first metal oxide is 0.01 to 50 μm.

2. The catalyst support according to claim , wherein a content of the first metal oxide powder is 10 to 60 weight % of the total amount of metal oxides constituting the coating.

3. The catalyst support according to claim 1, wherein the first metal oxide powder is sealed in the matrix and is supported on the surface of the substrate.

4. The catalyst support according to claim 1, further comprising a noble metal supported on the surface of the first metal oxide powder.

5. The catalyst support according to claim 1, further comprising a noble metal supported on the surface of the coating.

6. The catalyst support according to claim 1, wherein the catalyst support is suitable for hydrogen production reaction.

7. A method of producing a catalyst support according to claim 1, said method comprising:
   obtaining the coating by heat treating the substrate after applying a coating composition obtained by mixing the first metal oxide powder together with a fluid raw material composition containing a raw material of a second metal oxide of at least one member selected from the group consisting of alumina, zirconia, titania, iron oxides, oxides of rare earth elements, alkali metal oxides and alkali earth metal oxides, at a shear rate of 1000 $sec^{-1}$ or higher.

8. The method of producing the catalyst support according to claim 7, wherein the raw material of the second metal oxide is of at least one member selected from the group consisting of colloidal particles of alumina, zirconia, titania, iron oxides, oxides of rare earth elements, alkali metal oxides and alkali earth metal oxides, and salts of aluminum, zirconium, titanium, iron, rare earth elements, alkali metals and alkali earth metals.

9. The method of producing the catalyst support according to claim 7, wherein the fluid raw material composition is a colloidal solution containing at least one member selected from the group consisting of colloidal particles of alumina, zirconia, titania, iron oxides, oxides of rare earth elements, alkali metal oxides and alkali earth metal oxides.

10. The method of producing the catalyst support according to claim 7, wherein the fluid raw material composition is a metal salt solution containing at least one member selected from the group consisting of salts of aluminum, zirconium, titanium, iron, rare earth elements, alkali metals and alkali earth metals.

11. The method of producing the catalyst support according to claim 7, wherein the powder is mixed together with the fluid raw material composition at a shear rate of 10000 $sec^{-1}$ or higher.

12. The method of producing the catalyst support according to claim 7, wherein a content of the first metal oxide powder is 10 to 60 weight % of the total amount of metal oxides constituting the coating.

13. The method of producing the catalyst support according to claim 7, wherein the second metal oxide is a matrix and the first metal oxide powder is sealed in the matrix and is supported on a surface of the substrate.

14. The method of producing the catalyst support according to claim 7, further comprising supporting a noble metal on a surface of the first metal oxide powder.

15. The method of producing the catalyst support according to claim 7, further comprising supporting a noble metal on a surface of the coating.

16. The method of producing the catalyst support according to claim 7, wherein the catalyst support is suitable for hydrogen production reaction.

* * * * *